INVENTOR.
GEORGE B. RABE
BY
HIS AGENT

INVENTOR.
GEORGE B. RABE
HIS AGENT

United States Patent Office 3,333,813
Patented Aug. 1, 1967

3,333,813
HIGH PRESSURE FLUID SEAL
George B. Rabe, Sparta, N.J., assignor to Thiokol Chemical Corporation, Bristol, Pa., a corporation of Delaware
Filed June 17, 1964, Ser. No. 375,703
6 Claims. (Cl. 251—172)

The present invention relates to a novel seal for preventing leakage of fluid between members of a fluid system. It is particularly useful when applied to high-pressure valves wherein leakage with the valve in the closed position must be kept to an absolute minimum and preferably completely eliminated.

In the past it has been difficult to seal effectively against leakage where high pressures were involved and many of the seals useful at low pressures have permitted leakage when they are exposed to high pressures. A principal reason for this leakage lies in the fact that side loads are present on the seal where it contacts the members to be sealed and tend to move or cock the seal away from its sealing contact to thus reduce its effectiveness as a seal with resulting leakage. Such an undesirable result is particularly evident in the case of ball valves utilized in high pressure fluid systems where ordinary seal leakage has become so severe that it cannot be tolerated. In the case of flammable or explosive fluids, especially those of a cryogenic nature, the leakage also creates a considerable hazard and expense.

The present invention has solved this problem by providing a seal which actually becomes more leakfree as the pressure is increased and which will not be subjected to displacing and disturbing side loads under pressurized conditions.

The main object of the present invention is to provide a high pressure fluid seal for preventing leakage between any members of a fluid system and also between the movable and fixed members of a valve of such a system.

An important object of the present invention is to provide a seal for a ball valve which will prevent leakage of the pressure fluid between the ball and its housing.

A further object of the present invention is to provide a seal for preventing leakage between the movable and fixed members of a valve which will eliminate seal-displacing, leak-producing, side loads on the seal member.

Another object of the present invention is to provide a seal having the foregoing attributes which is at once simple, inexpensive, lightweight, easily replaceable if necessary, and readily adaptable to practically any desired size or material.

Other objects and advantages of the present invention will become apparent during the course of the following description.

In the drawings I have shown several embodiments of the invention. In these showings:

Figure 1:
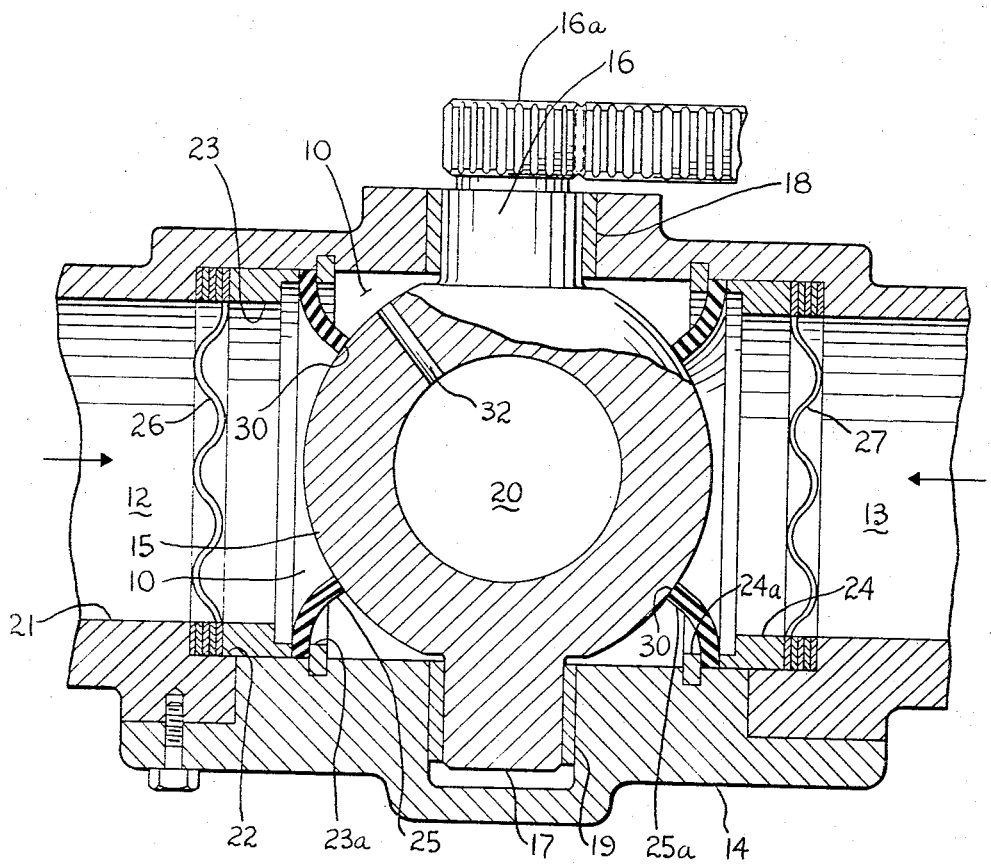
FIGURE 1 is a longitudinal cross-sectional view of a typical ball valve showing one form of the seal.

With reference to FIGURE 1, a valve housing or body 10 defines a central cavity or chamber 11 having a fluid inlet 12 and a fluid outlet 13 and which is closed on its lower side by a circular, shouldered cap 14. A spherical ball 15 is located in chamber 11 and pivotally mounted for rotation about a vertical axis as shown by means of journals 16 and 17 supported by sleeve bearing 18 in the housing 10 and a sleeve bearing 19 mounted in a central recess in the cap 14. Any suitable external means (not shown) is provided to rotate the ball by means of the journal extension 16a. The ball has a relatively large central flow passage 20 passing entirely through it in a direction transverse to its axis of rotation and substantially aligned with and in communication with the inlet 12 and the outlet 13 in the manner shown.

Formed into the housing 10 is a cylindrical bore 21 terminating inwardly in a shoulder and a larger cylindrical bore 22 into the opposite ends of which are slidably fitted annular seal support rings 23 and 24. A pair of seals 25 and 25a are mounted against opposite surfaces of the ball 15 and the bore 22 in the manner shown with their convex sides exposed to the pressure of the fluid in the line in either the inlet 12 or the outlet 13. A light, wave-type spring washer 26 is interposed between support ring 23 and the shoulder of the body 10 and is placed therein under compression so that the support ring 23 is urged lightly against seal 25 in the manner shown to keep it in place prior to pressurization of the fluid in the line. A similar light, wave-type spring washer 27 is interposed between the support ring 24 and the body 10 to urge ring 24 lightly against seal 25a for the same purpose, the movement of both seals being limited by snap rings 23a and 24a.

Figure 3:
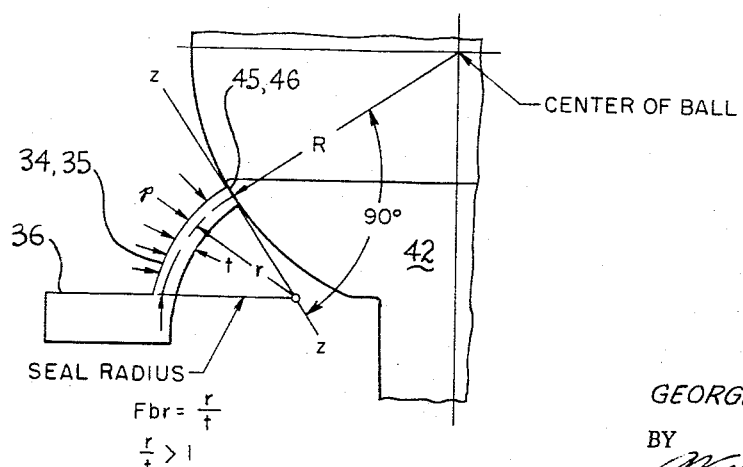
FIGURE 3 is a fragmentary, longitudinal sectional view showing the form of seal of FIGURE 2 and including a sketch of forces illustrating the principles of the invention.

The seals 25 and 25a are each in the form of an annular segment of a circular torus or an annulus of arcuate cross-section as shown in FIGURE 1. Thus, each has a convex face subject to pressure fluid and a concave face. A very important feature of this invention resides in the fact that the inner extremity of the toroidal segment, i.e. the inner edge 30 of the seal is normal to the surface of the circular ball at all peripheral points and that the origin of the radius of the circular arch lies on a tangent Z—Z of the ball's surface as indicated in FIGURE 3.

Under these conditions the pressure forces acting on the seal result in a reactive force between the ball 15 and the seals 25, 25a which is perpendicular, i.e. normal, to the face of the ball. Thus, there are no side loads at the contact surface 30 with the ball and the sealing force is applied with a maximum of effectiveness.

As a result, a very effective seal is created which is practically leak free when fluid pressure is applied to the convex or arched side of the seal. It has been found, however, that the ratio of the radius $r$ (see FIGURE 3) to the thickness $t$ must be greater than one if positive sealing is to be achieved, the actual amount of this ratio being dependent upon the material used. For instance, for "plastic" material such as tetrafluoropolyethylene, a ratio of about 1.25 is desirable, while with metals such as brass, bronze, copper or soft steel, the ratio can be higher because of the ability of the material to withstand the higher stresses imposed by the higher unit loading.

The ball valve 15 is provided with a vent bore 32 from the flow passage 20 to the cavity 10 behind the seals 25, 25a. This ensures low starting torque when the ball is actuated closed as otherwise the required starting torque would be very high.

Figure 2:
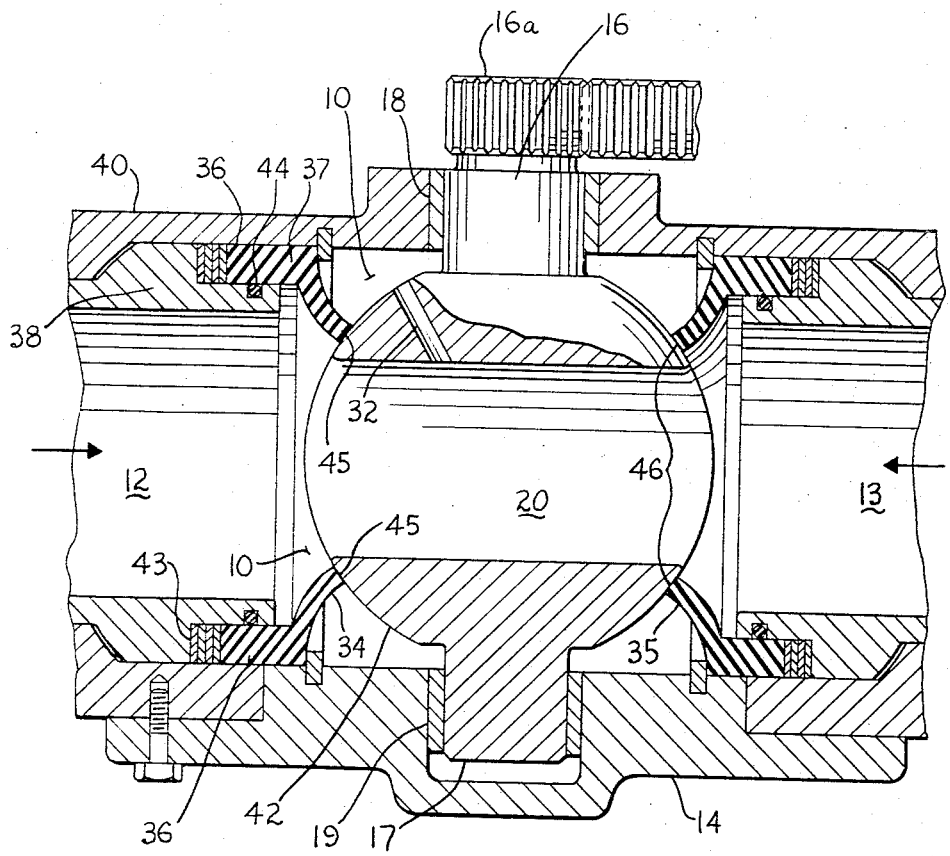
FIGURE 2 is a fragmentary similar view showing another form.

Another form of the seal is disclosed in FIGURE 2 wherein the novel arcuate annular portions of the seal annuli 34, 35 are each formed integrally with and extend inwardly of an outer flange 36 of a seal ring portion 37 which is slidably mounted in an encircling support ring 38 of the valve body 40. The seals 34, 35 are urged against the ball 42 by light wave-type spring washers 43 and axial leakage is prevented by O-rings 44.

It is to be noted that the ends 45 and 46 of the arcuate seal portions 34, 35 are respectively normal to the inner surface of the support ring 38 and to the surface of the ball 42 so that an even bearing pressure without side loads is exerted by the arcuate seal portions throughout their peripheral edge portions as disclosed in connection with FIGURE 1 and as will be further disclosed in connection with FIGURES 2 and 3.

The bearing pressure of the seals 34 and 35 on the ball 42 may be readily calculated, with reference to FIGURE 3, as follows:

(a) Axial load exerted on ball by seal
$$= \text{pressure} \times (r_o^2 - r_i^2)$$

(b) Bearing pressure of seal on the ball
$$= \text{pressure} \times \frac{r_s}{t} \frac{(r_i + r_o)}{(2r_i)}$$

The value of
$$\frac{(r_i + r_o)}{(2r_i)}$$

is usually very close to unity.

By the adjustment of $r_s$ and $t$, the bearing pressure of the seal on the ball can be fixed at any value desired. It should be noted that the O ring seal radius ($r_o$) must pass through point $a$.

Figure 4:
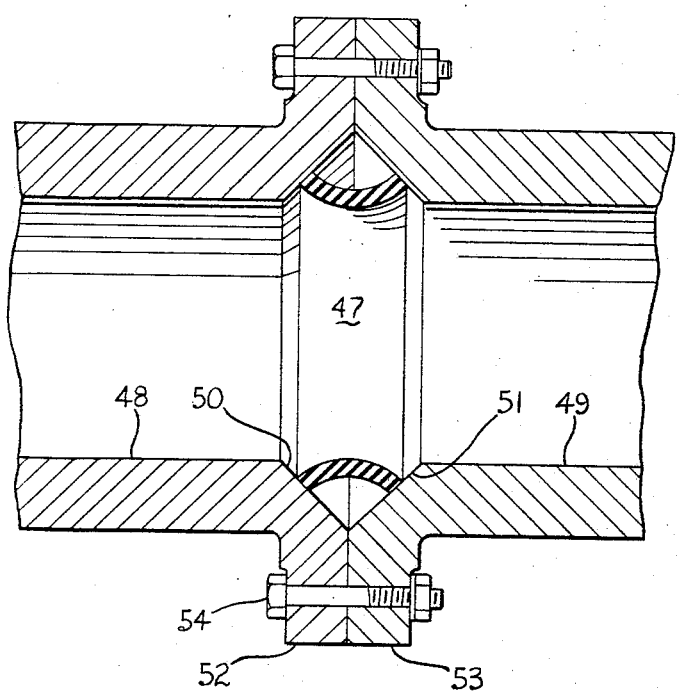
FIGURE 4 is a fragmentary, central, longitudinal sectional view similar to FIGURE 1 of a form of the invention as simply applied as a seal between two members of a fluid system such as a pipe joint.
Figure 5:
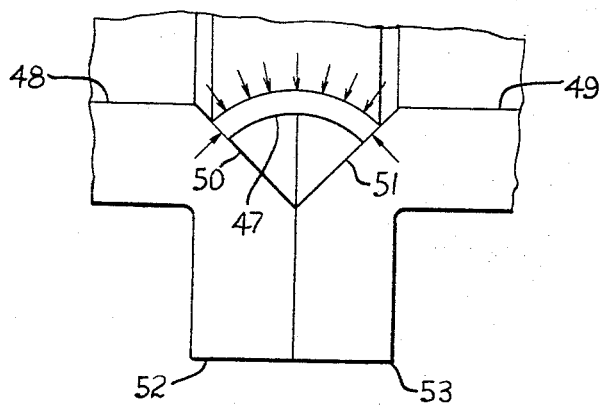
FIGURE 5 is an enlarged view of the seal and surrounding structure of FIGURE 4 showing the forces.

The form of the seal 47 disclosed in FIGURES 4 and 5 is similar to that of FIGURE 1 and is also used to prevent leakage between two members of a pressure fluid system. The members in this case are conduits 48 and 49, each having inclined inner surfaces 50, 51 leading to their flanges 52, 53 by which they are connected and retained as by bolts 54.

It will be noted that the convex side of the annular seal 47 is exposed to the fluid pressure within the conduits 48, 49 and that the ends of the seal are normal to and sealingly engage the adjacent inclined faces 50, 51 with an even pressure throughout their peripheries and without disturbing side loads.

It is to be understood that the forms of the invention herewith shown and described are to be taken as preferred examples of the same and that various changes in the shape, size and arrangement of parts may be resorted to without departure from the spirit of the invention or the scope of the subjoined claims.

I claim:

1. A high pressure fluid seal for a ball valve including a housing having a fluid inlet and outlet, and a ball rotatably mounted in said housing and having a fluid flow passage arranged transversely of its axis of rotation and in alignment with said inlet and outlet; comprising an annular seal mounted in the housing to effect a seal between it and the ball, at least a portion of said seal being arcuate in cross-section and having its convex surface subject to the fluid flow, the ends of said arcuate portion being normal to the engaged surfaces of the housing and to the ball to effect an even bearing and sealing pressure on said surfaces throughout the periphery of said annular seal.

2. A high pressure fluid seal for a ball valve including a housing having a fluid inlet and outlet, and a ball rotatably mounted in said housing and having a fluid flow passage arranged transversely of its axis of rotation and in alignment with said inlet and outlet; comprising an annular seal mounted in the housing to effect a seal between it and the ball, said seal having a portion of arcuate cross-section with its convex surface subject to the fluid flow and of constant thickness extending toward and into sealing engagement with the surface of said ball and being normal thereto at the point of said engagement to effect an even bearing pressure on said surface throughout its entire periphery.

3. In a ball valve having a housing including a fluid inlet and outlet and a ball rotatably mounted therein and including a fluid flow passage in substantial alignment with the inlet and outlet; a fluid seal comprising an annular sealing ring at least a portion of which is of arcuate cross-section mounted in said housing for effecting a fluid pressure seal between it and the ball, one end of said arcuate portion being normal to the surface of the ball and the other end thereof being substantially parallel to the axis of rotation of the ball at their respective points of engagement with the ball and the housing, the convex side of said arcuate portion being exposed to the fluid pressure, and means for mounting said ring in said housing against said ball to effect said pressure fluid seal.

4. The fluid seal recited in claim 3 wherein said annular ring is slidably mounted in the housing, and resilient means is mounted between the housing and said ring for urging the latter against the ball.

5. The fluid seal recited in claim 3 wherein said arcuate portion is formed integrally with said sealing ring and extends radially inwardly therefrom and toward the surface of the ball.

6. The fluid seal recited in claim 3 wherein said sealing ring includes a radially outer flange, and said arcuate portion is formed integrally with said flange and extends radially inwardly therefrom and toward the surface of the ball.

References Cited

UNITED STATES PATENTS

| | | | |
|---|---|---|---|
| 2,303,114 | 11/1942 | Egger | 277—236 |
| 2,837,307 | 6/1958 | Shand | 251—315 X |
| 2,893,682 | 7/1959 | Hintzman | 251—173 |
| 3,077,902 | 2/1963 | Vickery | 251—172 X |
| 3,181,834 | 5/1965 | Jennings | 251—172 |
| 3,217,922 | 11/1965 | Glasgow | 277—168 X |
| 3,233,862 | 2/1966 | Marsh | 251—315 X |

FOREIGN PATENTS

| | | |
|---|---|---|
| 686,387 | 1/1953 | Great Britain. |
| 843,149 | 8/1960 | Great Britain. |

CLARENCE R. GORDON, *Primary Examiner.*